United States Patent [19]

Napier

[11] 4,255,369
[45] Mar. 10, 1981

[54] METHOD OF CONSTRUCTING A WATER SKI FOOT SUPPORT

[75] Inventor: Barton K. Napier, Fort Worth, Tex.

[73] Assignee: Nash Manufacturing, Inc., Fort Worth, Tex.

[21] Appl. No.: 74,149

[22] Filed: Sep. 10, 1979

[51] Int. Cl.³ ............................................. B29D 27/04
[52] U.S. Cl. .................................. 264/46.6; 9/310 A; 9/310 AA; 248/615; 248/632; 248/633; 264/250; 264/255; 280/11.14
[58] Field of Search ...................... 264/46.6, 250, 267, 264/268, 269; 9/310 R, 310 A; 248/359, 359.1, 346.1, 345.1, 615, 632, 633, 560; 297/426; 272/1 B, 32, 96; 273/DIG. 18; 280/11.14, 11.15, 607, 636, 618, 633, DIG. 12; 428/158, 159, 315, 518

[56] References Cited

U.S. PATENT DOCUMENTS

| | | | |
|---|---|---|---|
| 1,858,752 | 5/1932 | Sentney | 248/632 X |
| 2,445,610 | 7/1948 | Drake | 9/310 AA |
| 2,816,852 | 12/1957 | Banks | 428/518 X |
| 2,900,648 | 8/1959 | Hedlund et al. | 9/310 AA |
| 2,939,159 | 6/1960 | Cravotta | 9/310 AA |
| 3,056,148 | 10/1962 | Abbott et al. | 9/310 A |
| 3,119,130 | 1/1964 | Senne et al. | 280/11.14 X |
| 3,446,880 | 5/1969 | Enicks | 264/46.6 |
| 3,466,700 | 9/1969 | Harrison | 264/46.6 X |
| 3,557,030 | 1/1971 | Simons | 264/46.6 X |
| 3,619,436 | 11/1971 | Gruss et al. | 264/46.6 |
| 3,772,110 | 11/1973 | Brown | 264/46.6 X |
| 4,011,819 | 3/1977 | Kessler | 264/255 X |
| 4,123,488 | 10/1978 | Lawson | 264/250 X |

FOREIGN PATENT DOCUMENTS

| | | | |
|---|---|---|---|
| 1026026 | 4/1953 | France | 248/633 |
| 806140 | 12/1958 | United Kingdom | 248/615 |
| 999515 | 7/1965 | United Kingdom | 264/46.6 |
| 1409418 | 10/1975 | United Kingdom | 264/250 |

*Primary Examiner*—Philip Anderson
*Attorney, Agent, or Firm*—Robert A. Felsman

[57] ABSTRACT

A method of constructing a water ski foot support results in a foot support with a tough vinyl backing and a soft cushion layer for comfort. First the backing is injection molded. During the injection molding, a raised rim is formed on the inner side of the backing. The backing is then supported in a horizontal position with its inner side facing upward. A plastisol resin is poured onto the inner side at room temperature. The backing and plastisol resin are heated, the heat causing the plastisol resin to change into a solid cushion layer, bonded to the backing.

5 Claims, 3 Drawing Figures

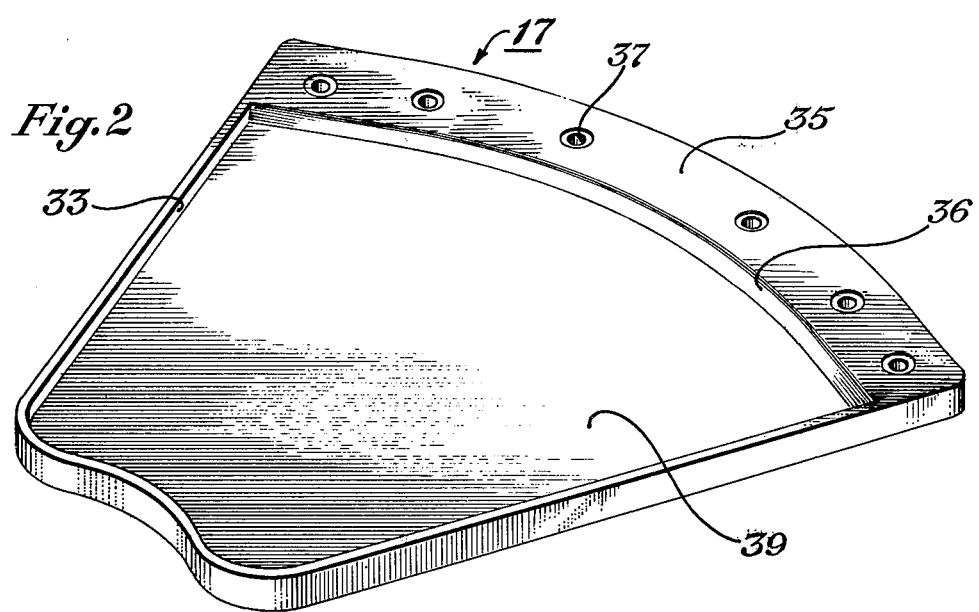
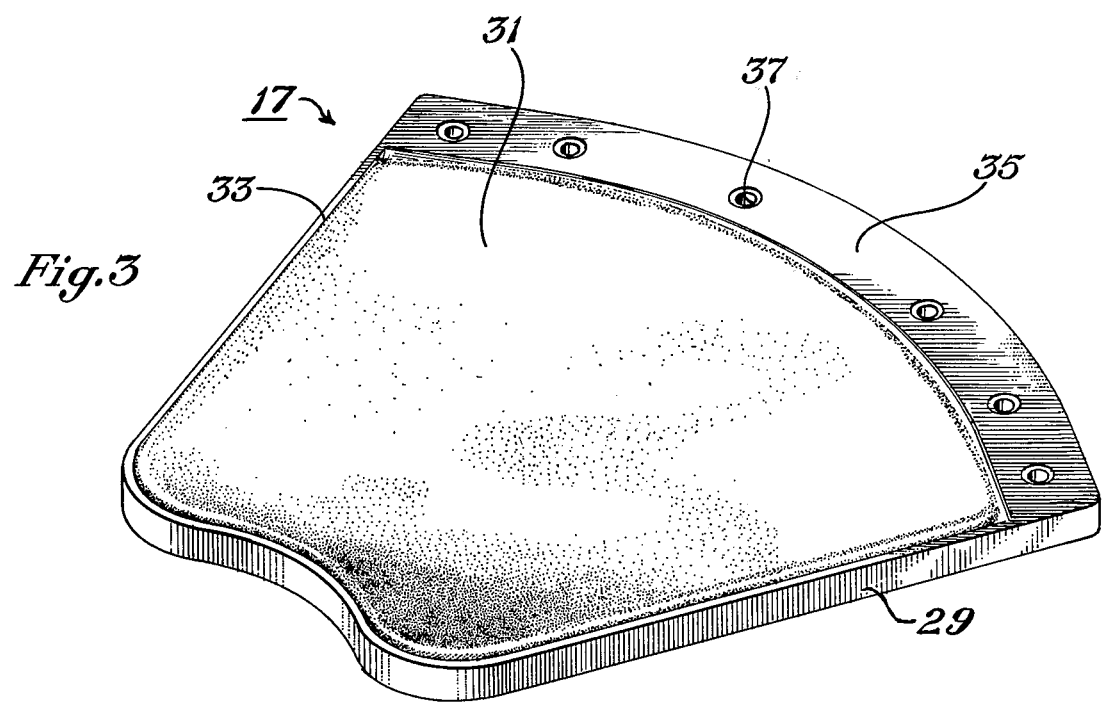

METHOD OF CONSTRUCTING A WATER SKI FOOT SUPPORT

BACKGROUND OF THE INVENTION

1. Field of the Invention

This invention relates in general to a method of forming laminates of flexible material, and in particular to a method of forming a cushioning layer on a water ski foot support.

2. Description of the Prior Art

Water skis have a boot binding for retaining one's foot to the ski. In addition, with slalom skis, wherein the skier uses a single ski, a second boot binding will be located to the rear of the main binding for retaining the other foot. The main boot binding has a forward support of flexible vinyl or rubber-like material, into which the user slides the forward portion of his foot. A heel support of similar material slides along the ski board to adjust for a tight fit. The rear boot binding on the slalom ski is similar to the forward support of the main boot binding.

To avoid tearing, the vinyl supports must be strong and tough. However, a strong vinyl backing is somewhat stiff and smooth, thus tends to chafe a user's foot and allow slipping. For comfort, one prior art support uses a laminate having a vinyl backing for strength and a cushioning layer for comfort. The preferred cushioning layer used is a foamable polyvinyl chloride plastisol resin that is soft and resists slipping.

In the prior art manufacturing method, a metal casting mold is used. First the vinyl backing material is poured into the mold and allowed to set or thicken to a certain extent. Then the plastisol resin is poured in at room temperature. The mold containing the two layers is placed in an oven. The oven causes the plastisol resin to change into a solid, soft cushion. After curing, the support is removed from the mold and mounted to the ski.

One disadvantage of this prior art method is that a casting mold is in use for several minutes for each support. For large scale production, numerous expensive casting molds must be used.

SUMMARY OF THE INVENTION

It is accordingly a general object of this invention to provide an improved method for constructing a water ski foot support.

It is a further object of this invention to provide an improved method for constructing a water ski foot support so that it has a tough smooth layer for strength and a soft cushion layer for comfort and resistance to slipping.

It is a further object of this invention to provide an improved method for constructing a water ski foot support of the type having a cushion layer that is adhered to the backing by a method that does not require a casting mold.

In accordance with these objects, a method is provided wherein the tough backing is formed by injection molding instead of pouring into a metal casting mold and allowing to cool. A rim is formed on the inner side of the backing during the injection molding step. The backing is removed from the mold and positioned horizontally, with the inner side facing upward. A foamable polyvinyl chloride plastisol resin is poured into the inner side of the backing, the rim serving as a mold. The backing with the plastisol resin is placed into a furnace where the temperature converts the plastisol resin into a solid cushion.

BRIEF DESCRIPTION OF THE DRAWINGS

FIG. 2 is a perspective view of a foot support backing of the type shown in FIG. 1, prior to forming the cushion layer.

FIG. 3 is a view of a foot support similar to FIG. 2, but with the cushion layer formed on the backing.

DESCRIPTION OF THE PREFERRED EMBODIMENT

Figure 1:
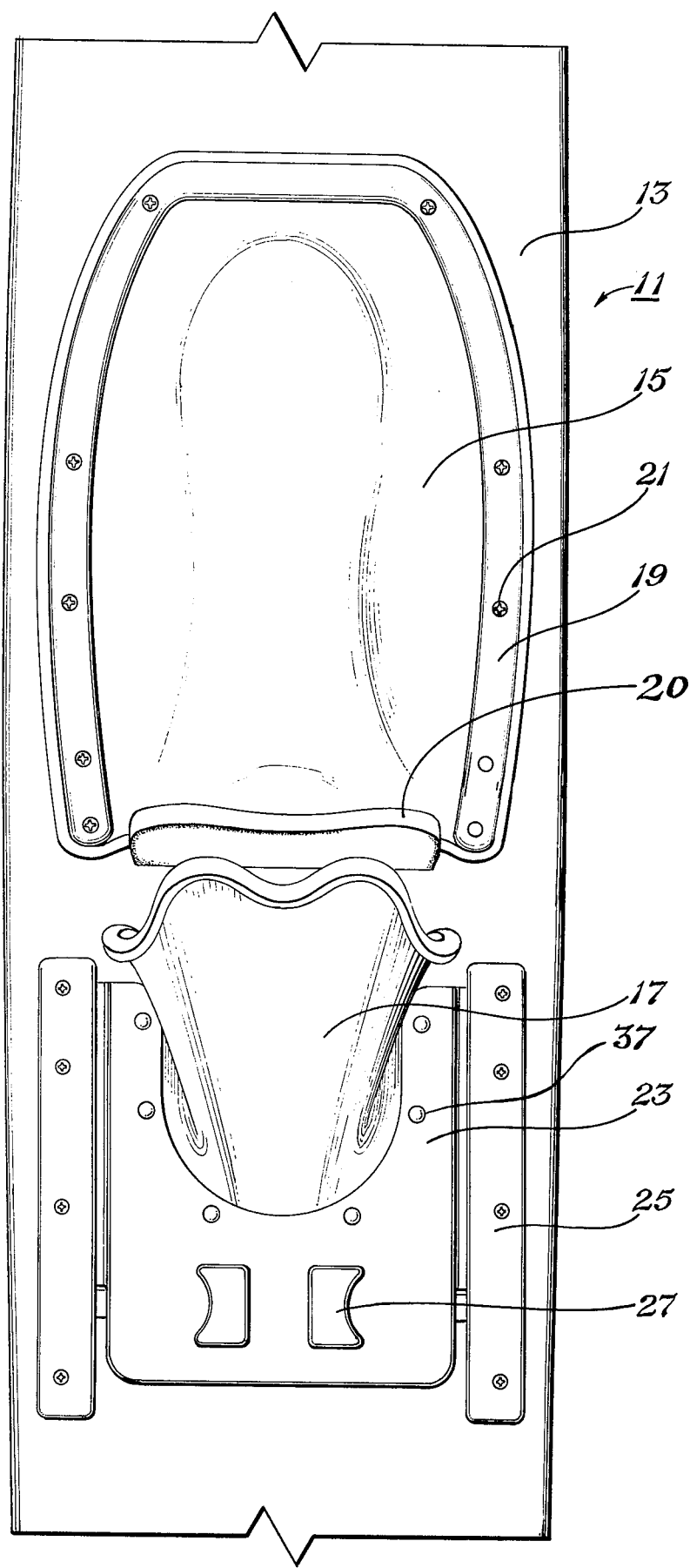
FIG. 1 is a top plan view of a portion of a water ski having foot supports constructed in accordance with this invention.

Referring to FIG. 1, a portion of the water ski is shown. Water ski 11 has an elongated board 13 that is several feet long and normally tapered at the front and rear (not shown). The main boot binding has a forward foot support 15 and a heel foot support 17. Forward support 15 is rigidly secured to board 13 by a metal strip 19, shaped generally in the configuration of a horseshoe. Metal strip 19 extends around part of the perimeter of forward support 15 and is secured to board 13 by screws 21. The configuration of support 15, when mounted, defines a toe portion or pocket, open at the rearward end for receiving the forward portion of the user's foot. The rearward end of support 15 terminates in a flap 20.

Heel foot support 17 is secured to a bracket 23 at its lower edge. Bracket 23 is slidably carried on board 13 by two guide tracks 25. Bracket 23 contains dogs that engage teeth (not shown) formed on guide tracks 25 for locking the heel support 17 selected distances from the forward support 15. Handles 27 are spring-loaded for retracting the dogs of bracket 23 to disengage them from guide track 25 and allow heel support 17 to slide longitudinally along board 13. Both the forward support 15 and heel support 17 contain an outer backing 29 of vinyl for strength, and an inner cushion layer 31 for comfort and resistance to slipping.

FIGS. 2 and 3 disclose only the heel support 17, however, the forward support 15 is constructed by the same method and differs only in configuration. Both the heel support 17 and forward support 15 are formed as a flat sheet, then mounted to board 13. As shown in FIG. 2, which discloses the heel support 17 prior to forming cushion layer 31, first the backing 29 is formed in the desired shape by injection molding. Backing 29 is substantially flat and has a raised rim 33 of about ⅛ inch height extending around the perimeter of the inner face or side 39. Backing 29 has a strip 35 extending along part of its perimeter containing holes 37 for receiving fasteners for securing to bracket 23, or in the case of forward support 15, for securing to board 13. Strip 35 is about ¾ inch wide and is separated from the remainder of the inner side 39 by a partition 36 of the same height as rim 33. Backing 29 is a thermoplastic resin material, preferably polyvinyl chloride. The injection molding is by the well known method wherein pellets of raw material are heated to form a melt, the melt being injected into a cavity, quickly forming backing 29 by heat and pressure.

After removal from the injection mold, the backing 29 is placed horizontally with its inner side 39 facing upward. Then a foamable polyvinyl chloride plastisol resin at room temperature is poured onto inner side 39 with rim 33 serving as a mold. The plastisol resin is a rubber-like material of a type that expands and cures into a soft cushion layer by heating. The preferred type is known as "Plastisol", manufactured by M & R Plastics Company, St. Louis, Mo. The plastisol resin is poured to a level that is calculated to cause sufficient expansion to create the cushion 31 substantially flush with rim 33. The precise amount of plastisol resin depends on the time and temperature of curing.

In the embodiment shown, the plastisol resin is preferably not placed on strip 35 for the heel support 17. For the forward support 15, however, the cushioning layer preferably covers the entire inner side. Each fastener hole in the forward support 15 is formed with a cylindrical raised rim during the injection molding to prevent the plastisol resin from entering the holes.

After the dispersion has been poured onto the inner side 39, the backing is placed in an oven at about 350° to 375° F. for five to ten minutes, depending on thickness and the type of backing material. The heat causes the plastisol resin to expand and cure into the solid cushion 31. Cushion 31 is substantially flush with the edge of rim 33. During heating, backing 29 will not melt. Depending upon the material, backing 29 will become slightly sticky. Cushion 31 will bond to backing 29.

After cooling, the forward support 15 is connected to board 13 by strip 19 and screws 21, with the cushion 31 facing downward. The configuration of forward support 15 is such that when the edges are drawn into the shape of metal strip 19, the support 15 will pucker upwardly to define the pocket. Similarly, the heel support 17 is mounted to bracket 23, with cushion 31 on the inside. Drawing the support 17 so that strip 35 is in a circular configuration causes the support to extend upwardly for receiving the user's heel.

It should be apparent that an invention having significant advantages has been provided. Injection molding the backing is considerably faster than the prior art casting of the backing. By injection molding the backing and utilizing a rim in the backing, a casting mold is unnecessary for the pouring of the cushion layer. Consequently, a strong support is provided with a layer of cushioning at a considerably less expense than the prior art method.

While the invention is shown in only one of its forms, it should be apparent that it is not so limited but is susceptible to various changes and modifications without departing from the spirit thereof.

I claim:

1. A method of constructing a water ski foot support comprising:
    injection molding a backing of thermoplastic resin material with a raised rim on its inner side, and removing it from the injection mold;
    supporting the backing in a horizontal position with its inner side facing upward;
    pouring a foamable polyvinyl chloride plastisol resin onto the inner side of the backing with the rim acting as a mold for the plastisol resin, the plastisol resin being of a type that expands and forms into a solid cushion by heating;
    heating the backing and the plastisol resin at a temperature and for a time to cause the plastisol resin to expand and allowing the backing and plastisol resin to cool to form a solid cushion layer bonded to the inner side of the backing.

2. The method according to claim 1 wherein the backing is polyvinyl chloride resin.

3. The method according to claim 1 wherein the plastisol resin is poured at room temperature.

4. The method according to claim 1 wherein the amount of plastisol resin poured is selected so that after heating, the cushion is substantially flush with at least part of the rim.

5. A method of constructing a water ski foot support, comprising:
    injection molding a bcking of polyvinyl chloride resin having an inner side with a raised rim, and removing the backing from the mold;
    supporting the backing in a horizontal position with its inner side facing upward; then
    pouring foamable polyvinyl chloride plastisol resin at room temperature onto the inner side, the dispersion being of a type that expands and forms onto a solid cushion by heating; then
    placing the backing and the plastisol resin in an oven, the rim of the backing acting as a mold for the plastisol resin; then
    heating the backing and the plastisol resin in the oven at a temperature and for a time to cause the plastisol resin to expand, then cooling the backing and the plastisol resin to form a solid cushion bonded to the inner side of the backing, the amount of plastisol resin being selected so that the cushion is substantially flush with the rim.

* * * * *